Oct. 30, 1962 F. A. HOWARD 3,060,990
INFLATION VALVE ARRANGEMENTS FOR PNEUMATIC TIRES
Filed Oct. 9, 1959 3 Sheets-Sheet 3

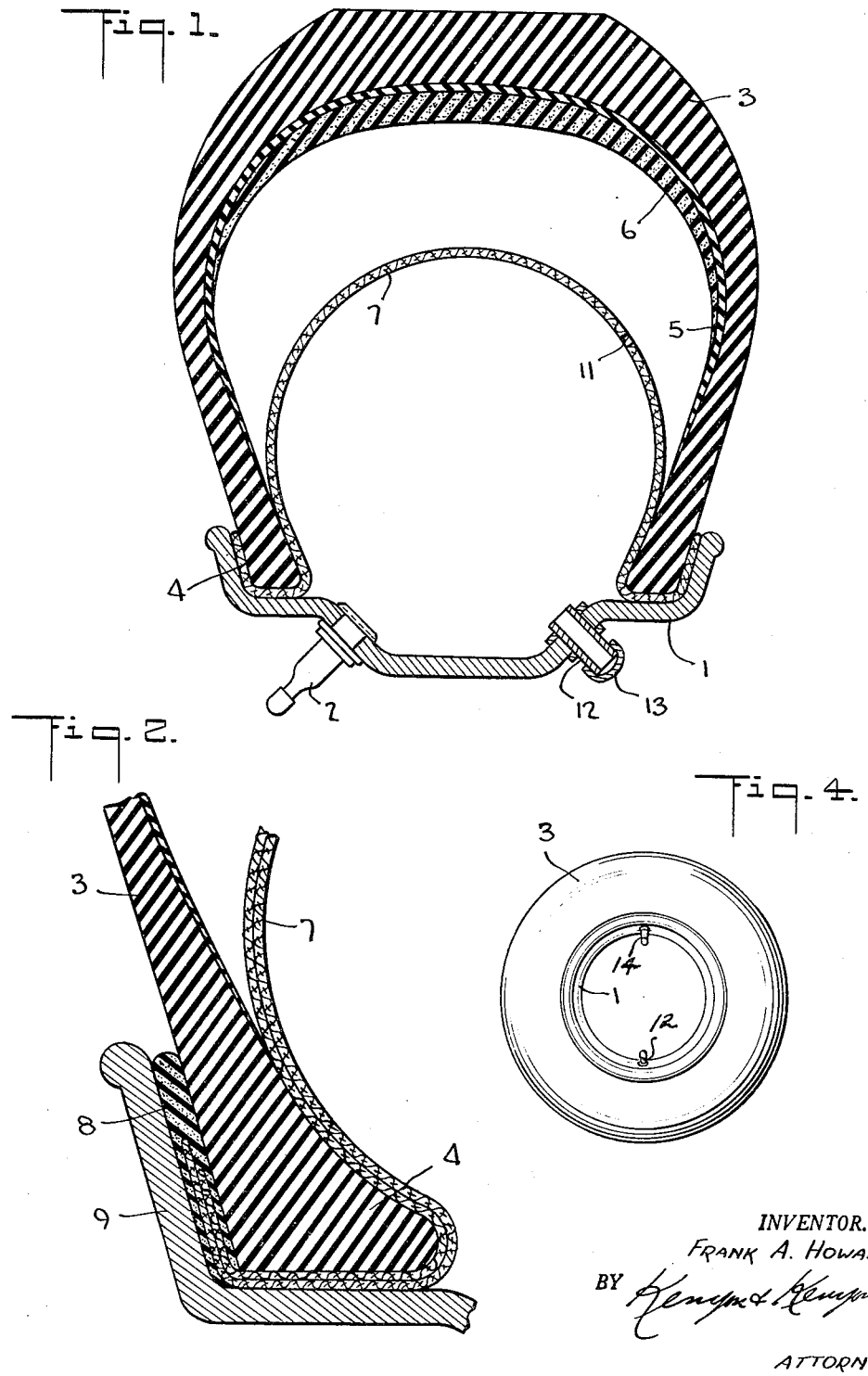

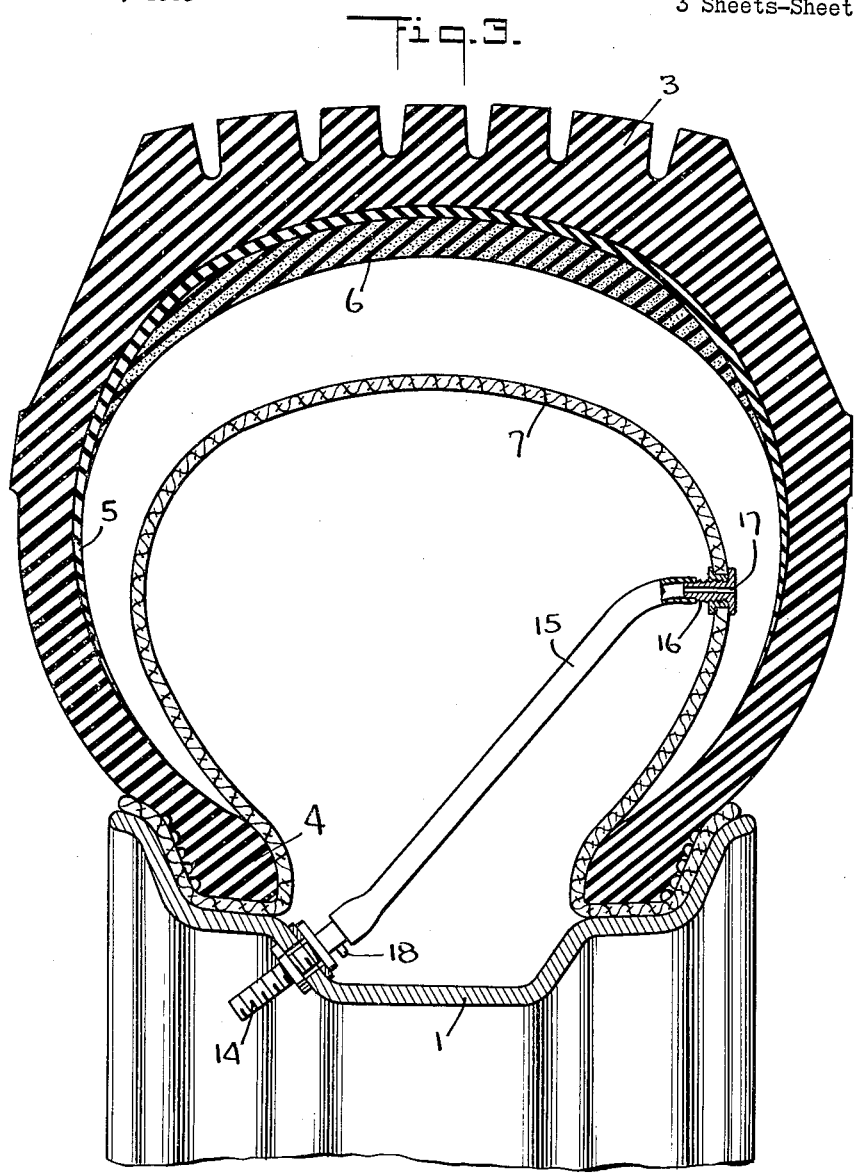

INVENTOR.
FRANK A. HOWARD
BY Kenyon and Kenyon
ATTORNEYS

United States Patent Office 3,060,990
Patented Oct. 30, 1962

3,060,990
INFLATION VALVE ARRANGEMENTS FOR PNEUMATIC TIRES
Frank A. Howard, New York, N.Y., assignor to Firestone Tire & Rubber Co., Akron, Ohio, a corporation
Filed Oct. 9, 1959, Ser. No. 845,441
5 Claims. (Cl. 152—342)

My invention relates to pneumatic tires and more specially to a tubeless tire construction embodying an auxiliary ring. This application is a continuation-in-part of the co-pending patent application Serial No. 618,960, filed October 29, 1956, now abandoned.

The invention will be understood from the following specifications taken in connection with the annexed drawings in which:

FIGURE 1 is a cross section through a rim and tubeless tire embodying my invention;

FIGURE 2 is an enlarged section through the tire bead portion of the assembly;

FIGURE 3 is a cross section taken through a rim and tubeless tire embodying another form of my invention;

FIGURE 4 is a front view of the tire shown in FIG. 3; and

Figure 5:
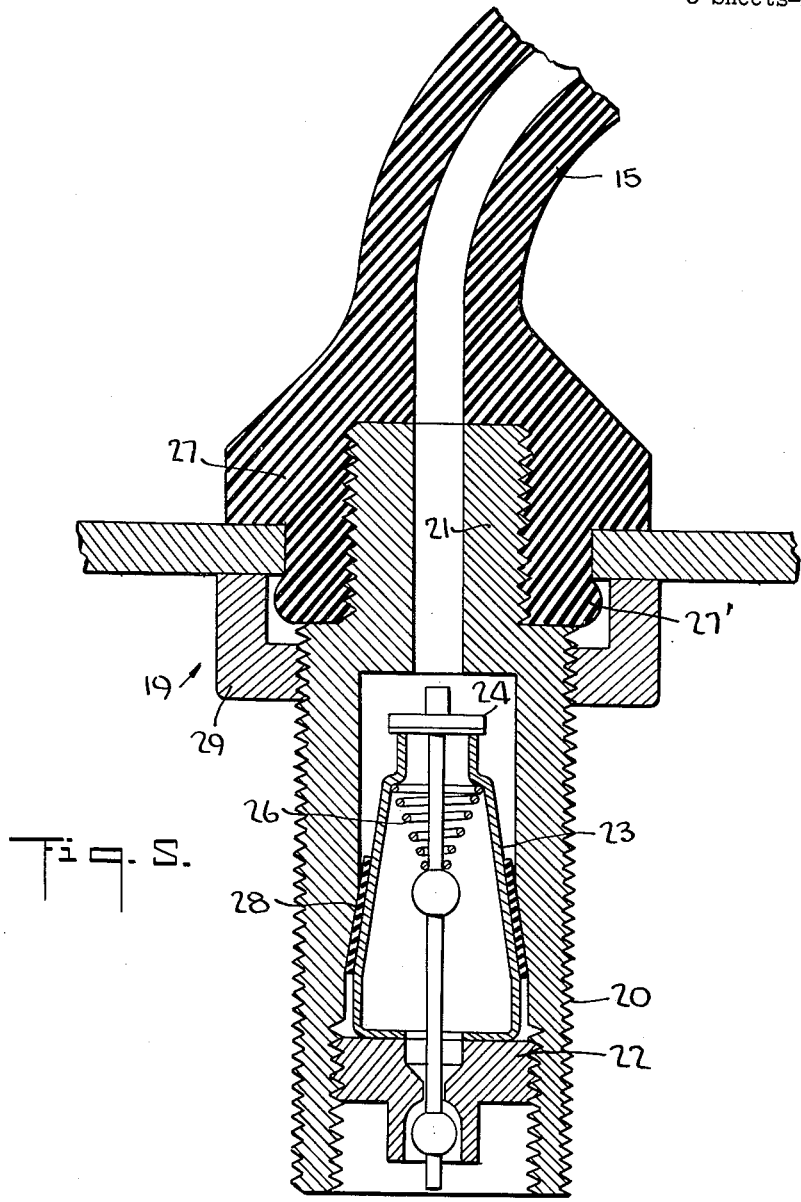
FIGURE 5 is a section taken through a portion of the rim of a tubeless tire and illustrating an alternative form of valve structure.

Referring to FIG. 1, the numeral 1 indicates a one-piece metal rim of the drop-center straight-side type now commonly used for automobile wheels. A unitary valve assembly 2 of standards construction may be inserted in a hole in the rim and fastened in place to make an air-tight connection with the rim. The tire casing 3 is of the usual U-shaped straight-side construction, the tire beads 4 having a loose circumferential fit on the rim 1. The tire casing preferably has a complete lining of thin rubber of a quality selected for its impermeability to air, such as the co-polymer of isobutylene with small percentages of isoprene known to the trade as butyl rubber. This lining is indicated by the numeral 5. There may also be a second lining made up of a suitable soft rubber composition, indicated at 6, which covers the tread and shoulder portions of the inner tire face and serves to seal punctures in a manner now well understood. The construction so far described is that of a known type of tubeless vehicle tire and rim. Under the internal air pressure applied through the valve 2 the tire beads are forced axially outward into tight contact with the flanges of the rim, and if the rim surface be perfect, the outer faces of the tire beads form an air-tight seal against the rim flanges. Sometimes this seal is perfected by application of cement, sometimes by reliance upon rubber rings or facing on the outer surface of the tire bead. Such a tire has the advantage of simplicity and low cost, the further advantage of reduced friction under bending, and the elimination of several disadvantages inherent in the use of inner tubes. The tubeless construction has, however, many well-recognized disadvantages of its own, and it is the particular object of the present invention to provide practical and economical means for overcoming these disadvantages.

In accordance with my invention, there is provided a substitute for an inner tube in the form of a supplementary or safety ring designated 7 shaped like the Greek letter omega in cross section, the outwardly facing flanges receiving the bead portions of the casing 3, as clearly shown in FIGURE 1. One advantageous construction for such an omega ring is illustrated in detail in FIGURE 2. The ring is made up of two plies or layers of tire fabric or cords cemented and coated by relatively thin films of rubber, except on the upstanding portion of the flange where there is a relatively thick and soft rubber coating designated 8 which lies between the outer face of the tire bead 4 and the vertical rim flange 9. The two plies of fabric which make up the body of the ring 7 lie in the center of the flange portion 8 so that the soft rubber making up the flange bears against the tire bead 4 as well as the rim flange 9. Preferably the soft rubber flange 8 has slightly tacky surfaces so that when once brought into contact with the tire bead and rim flange it will tend to adhere unless displaced with some force, and to form the seal more easily the faces of the flange 9 may have continuous circumferential corrugations which compress to a substantially flat surface under pressure.

The omega ring 7 is substantially impermeable due to its rubber coating but may be provided with a minute leakage hole or slow-leak opening designated 11, as is common in the so-called "safety tubes." The leakage hole is preferably located on the flank of the ring, as shown in FIGURE 1, so that it will not become filled or clogged by the puncture-sealing lining 6 in the event the tire becomes deflated.

As an additional improvement in the construction, I may employ a supplementary valve designated 12 and shown in FIGURE 1 as being located on the right side of the rim in the same position as the normal valve 2. This is for simplicity of illustration only. I prefer to mount the second valve 12 on the same side of the rim as the normal valve 2 but at least 180° distant therefrom, so as to serve as a perfect counterbalance for the normal valve. The valve 12 may be of special construction or it may be a standard valve from which the valve mechanism has been removed leaving only the cap 13 as a closure. As will later appear, the correct functioning of the supplementary valve 12 requires that it have a wide-open air passage of substantial size.

In assembling the construction shown and described, the omega ring 7 is first installed in the casing 3. The flanges 8 of the omega ring may be pressed against the beads 4 of the casing, by hand, with sufficient force to cause them to adhere slightly. The casing carrying the ring is then mounted on the rim 1 in the usual way, utilizing the drop-center portion of the rim. It should be noted that the thickness of the cylindrical portions of the flanges on the omega ring is less than the circumferential clearance normally provided between the tire bead and the face of the rim, so that the ring may be used with an ordinary casing and rim designed for use with an inner tube. To complete the mounting operation, the cap 13 on the supplementary valve 12 is removed and a large volume of gas under high pressure is admitted suddenly through this supplementary valve into the annular chamber created by the omega ring and the rim 1. It will be noted that this chamber is very much smaller in cross section and in volume than the casing 3 so that it is easier to build some internal pressure rapidly even though there is at the outset considerable leakage under the beads. The pressure may be applied either by a hose connection from the ordinary tire inflation tank, or it may be applied from a large or small gas cylinder, such as $CO_2$ gas cylinder. The effect of this very quick increase in gas pressure within the small chamber between the rim and the omega ring is to force both beads of the tire firmly outward against the flanges 9 of the rim, and especially if the surfaces of the ring flange 8 are slightly tacky, this contact when once made remains reasonably tight. When this initial inflation step, the purpose of which is to form the initial seal between the beads of the tire and the rim flange 9, has been carried out, the cap 13 may be replaced on the supplementary valve 12. It is immaterial whether the internal pressure is wholly released at this time or not. The final inflation of the tire up to the desired pressure is now carried out in the usual way through the standard valve 2.

As described in the foregoing, the omega ring is a separate member which is first applied to the tire casing when the tire is mounted on the rim. It may, however, be an integral part of the tire casing, permanently cemented or vulcanized in place.

The complete tire of my invention has numerous advantages over earlier forms of pneumatic tires. It may be made by combining the omega ring with a standard type of tire casing at the time of mounting the casing on the rim, the omega ring then replacing the usual inner tube and giving the advantages of a tubeless tire, and also the advantages of a tire having a "safety" tube. Thus in the event of a casing failure or blowout, the omega ring remains inflated for a time sufficient to permit slowing up or stopping the vehicle, and the dangers attendant upon sudden and complete deflation of a pneumatic tire at high speeds are avoided.

Because of the omega ring, it is possible to use rims which would otherwise be impractical for tubeless tires. The types of difficulties with tubeless tires are overcome. Firstly, it becomes much simpler and easier to establish an initial contact or seal between the rim flanges and the tire bead. The small capacity of the gas chamber within the omega ring makes it easy to obtain the initial internal pressure required to force the beads against the rim flanges. A supplementary valve with a large open passage is useful but not essential for this initial step. If the vertical flanges of the omega ring are even slightly tacky, the initial seal thus obtained will be maintained until the inflation is completed through the regular valve, whether or not the initial pressure is maintained. In place of using the supplementary valve described, the regular valve, with the valve mechanism removed to provide a large open gas passage, may be used for this initial inflation, and the initial seal will not be lost when the initial pressure is relieved for the purpose of reinstalling the valve parts preparatory to final inflation.

Secondly, the rubber-faced vertical flanges of the omega ring eliminate the need for using cement between the tire beads and the rim flanges, or altering the tire molds to provide for rubber facing or integral sealing corrugations on the tire beads. Also it is possible to use a sufficient thickness of rubber on these flanges of the omega ring to seal against rim flanges which are quite imperfect.

The tire of my invention may have all of the following additional advantages:

There is no inner tube, therefore less thickness of material to flex and develop heat in the tire when rolling under a load.

Since it is in contact with the casing only near the bead, the omega ring, which substitutes for the inner tube, flexes very little in service, and neither creates heat in nor interferes with dissipation of heat from the upper side walls of the casing, or the tread and shoulders where flexure is greatest.

My construction permits the direct application of the puncture-sealing lining to the inner face of the casing, which is impractical when any form of inner tube is used.

It gives the same temporary protection against casing failure which is provided by a complete "safety inner tube."

In general, my construction provides a puncture-proof, blowout-safe, tubeless pneumatic tire, suitable for motor vehicles, including airplanes, i.e., especially ease of mounting and inflation, and maintains a perfect final seal against rims which would be regarded as unsuitable for tubeless tires of other design. The omega ring, which substitutes for an inner tube, is relatively cheap, light, simple, and does not involve the important disadvantages inherent in an actual inner tube, either of the standard type or of the "safety" type.

In the tubeless tire shown in FIG. 1, the inner chamber defined by rim 1 and safety ring 7 is inflated through the normal valve 2 and the outer chamber defined by ring 7 and casing 3 is inflated by air passing through the leakage hole 11 in the ring. The inner and outer chambers may of course be filled through separate valves. In any event the supplementary tube or valve 12 serves to permit more rapid preliminary inflation of the tire.

In the embodiment illustrated in FIGS. 3 and 4, normal inflation of the inner and outer chambers of the tubeless tire is effected by means of a dual-valve 14 which is mounted on rim 1, one opening of the valve communicating with the outer chamber through a suitable tube or rubber hose 15, the other opening communicating directly with the inner chamber. Safety ring 7 is provided with a metal rivet or grommet 16 through which there is bored a small hole 17.

Rubber hose 15 is connected to grommet 16 so that the outer chamber may be inflated through one opening in dual-valve 14. The dual-valve is provided with a lateral opening 18 for inflation of the inner chamber. The dual-valve 14 may be of any standard type known in the art and preferably is of the type disclosed in my co-pending application Serial No. 569,074, filed March 2, 1956, now Patent No. 2,934,127, entitled "Dual-Valved Safety Pneumatic Tire."

As best seen in FIG. 4, also mounted on the same side of the rim as the dual-valve 14 but displaced 180° therefrom so as to counterbalance same is the supplemental valve 12 which may be a standard valve or merely a tube having a cap closure 13 to provide a relatively large opening for rapid preliminary inflation.

Another preferred form of valve for inflating the outer chamber is illustrated in FIG. 5, the valve, generally defined by numeral 19, being mounted on the rim 1, a supplementary valve (not shown) also being mounted in the rim in the manner previously described. Valve 19 is constituted by an externally threaded sleeve 20 provided with a nipple extension 21. Supported within the sleeve and held therein by nut 22 is a conical valve core 23. A rubber gasket 28 effects a seal between the core and sleeve. The inwardly opening valve element 24 mounted on the stem 25 which extends axially through the core is held closed by a spring 26, the stem passing outwardly through nut 22 in the usual way.

The rubber tube 15 which is coupled to the grommet 16 in the safety ring (note FIG. 3) terminates in a rubber coupling head 27, the valve nipple 21 being inserted or vulcanized therein. The head is provided with an enlarged portion 27' whose diameter is slightly larger than the opening in the rim, thereby holding the head in place when it is first installed from the inside in the process of mounting the tire and ring on the rim. The valve is permanently secured to the rim by a ring nut 29.

Thus the valve 19 serves for inflation of the outer chamber only, and more rapid inflation of the inner chamber for mounting the tire on the rim as well as final or permanent inflation of the inner chamber to desired operating pressure is accomplished through the supplemental tube which in this instance must be provided with a valve.

While I have shown and described in considerable detail several embodiments of my invention and have referred to certain variants thereof, it will be understood that this is only for the purpose of clear exposition of the invention, and that I do not regard the invention as limited to these details or any of them, save insofar as such limitations are included within the terms of the following claims, in which it is my intention to claim all novelty inherent in my invention as broadly as is permissible in view of the prior art.

What is claimed is:

1. A pneumatic tire comprising in combination, an airtight channel-shaped rim, an outer air-tight casing of U-shaped cross-section having beads adapted to seal by internal pressure against the side flanges of said rim, a thinner flexible inner ring of similar section and substantially smaller than the interior of said casing, said inner ring normally contacting only the beads of said casing, a dual-valve mounted on said rim and communicating both with the outer chamber defined between said casing and said ring and the inner chamber defined between said ring and said rim to effect inflation of said chambers, said dual valve having a substantially narrow tube providing communication to said outer chamber, and a supplementary tube of larger diameter than said narrow tube mounted on said rim and communicating with said inner chamber to effect rapid preliminary inflation thereof to facilitate mounting of the tire on the rim, said supplementary tube being mounted on said rim on the same side as said dual valve but displaced 180 degrees therefrom.

2. In combination with a U-shaped pneumatic tubeless tire mounted on an air-tight rim having a circular valve opening, said tire having an inner tire ring of similar cross-section and substantially smaller than the interior of said tire, said ring forming an outer chamber defined between said tire and said ring and an inner chamber defined between said rim and said ring, a valve comprising a rubber coupling head of circular cross section and of diameter larger than said circular valve opening in the rim in which it fits, whereby the coupling may be forced into the rim valve opening under compression, said coupling head having a major circular enlargement forming a shoulder which bears on the inner face of the rim to form a permanent air seal therewith, and a minor circular enlargement which bears on the outer face of the rim to retain the coupling in position in the rim during the mounting operation, a flexible air conduit extending within said inner chamber and joining the inner end of the rubber coupling with an opening in said ring leading to said outer chamber, a rigid nipple hermetically secured in the outer end of the coupling, and a check valve mounted in the outer bore of said nipple.

3. A combination in accordance with claim 2 in which the rubber coupling head is formed integrally with a rubber tube forming the flexible air connection.

4. A combination in accordance with claim 3 in which the rubber coupling head is positively secured in the rim by a ring nut engaging external threads on the nipple.

5. A tubeless tire adapted to be mounted on a rigid air-impermeable rim provided with side flanges, said tire comprising a U-shaped casing for encircling said rim and a safety ring of smaller cross-section interposable between said casing and said rim to define an outer inflatable chamber in the space encompassed by said casing and said ring and an inner inflatable chamber in the space encompassed by said ring and said rim; said casing having side walls terminating in beads, said ring being formed of relatively thin flexible inextensible material of strength and durability for limited service as an inner pneumatic tire upon complete deflation of said outer chamber and having a cross-section of omega shape to provide side channels adapted to receive the respective beads of said casing, the upstanding marginal flanges of said channels having their outer faces formed of air-sealing material for contacting the inner faces of said rim flanges to close the said inner inflatable chamber, the inner faces of said upstanding flanges contacting the exterior faces of said beads to close the said outer inflatable chamber, a dual valve having a substantially narrow air tube mounted on said rim and communicating both with said inner chamber and said outer chamber to effect permanent inflation of said tire, said dual valve having a substantially narrow tube providing communication to said outer chamber, and a supplementary valved tube of larger diameter than said narrow tube communicating with said inner chamber and mounted on said rim at a position angularly displaced 180 degrees relative to said first tube to effect more rapid preliminary inflation of said tire thereby facilitating the tire mounting operation.

References Cited in the file of this patent

UNITED STATES PATENTS

| | | |
|---|---|---|
| 2,091,006 | Mayne | Aug. 24, 1937 |
| 2,513,817 | Pennington | July 4, 1950 |
| 2,634,785 | Tubbs | Apr. 14, 1953 |
| 2,798,528 | Herzegh | July 9, 1957 |
| 2,811,189 | Howard | Oct. 29, 1957 |
| 2,861,619 | Wyman | Nov. 25, 1958 |
| 2,928,447 | Hosking | Mar. 15, 1960 |